US008356477B2

(12) United States Patent
Schlipf et al.

(10) Patent No.: US 8,356,477 B2

(45) Date of Patent: Jan. 22, 2013

(54) DUAL LINEAR ACTUATOR

(75) Inventors: Bernhard Schlipf, Bremen (DE); Mark Heintjes, Bremen (DE)

(73) Assignee: Airbus Operations GmbH (DE)

( * ) Notice: Subject to any disclaimer, the term of this patent is extended or adjusted under 35 U.S.C. 154(b) by 574 days.

(21) Appl. No.: 12/157,934

(22) Filed: Jun. 13, 2008

(65) Prior Publication Data

US 2009/0013862 A1 Jan. 15, 2009

(30) Foreign Application Priority Data

Jun. 15, 2007 (DE) ......................... 10 2007 027 698

(51) Int. Cl.
*F16D 31/02* (2006.01)
*F01B 9/04* (2006.01)

(52) U.S. Cl. ............................ 60/403; 74/89.24; 92/136

(58) Field of Classification Search .................... 92/136; 60/403; 74/89.24
See application file for complete search history.

(56) References Cited

U.S. PATENT DOCUMENTS

| | | | | |
|---|---|---|---|---|
| 1,588,972 | A * | 6/1926 | Machacek | 92/136 |
| 3,302,469 | A | 2/1967 | Ortelli | |
| 4,132,041 | A | 1/1979 | Van den Broek et al. | |
| 4,872,363 | A * | 10/1989 | Rosenthal | 74/89.24 |
| 5,931,048 | A * | 8/1999 | Slocum et al. | 74/490.07 |
| 2006/0156850 | A1* | 7/2006 | Mueller | 74/490.01 |
| 2006/0180313 | A1* | 8/2006 | Reynolds | 166/341 |

FOREIGN PATENT DOCUMENTS

| | | |
|---|---|---|
| DE | 1576157 | 12/1970 |
| DE | 2750013 | 5/1978 |
| DE | 3118805 | 12/1982 |
| GB | 850639 | 10/1960 |

* cited by examiner

*Primary Examiner* — F. Daniel Lopez

(74) *Attorney, Agent, or Firm* — Lerner,David, Littenberg, Krumholz & Mentlik, LLP

(57) ABSTRACT

An actuator having two or more interconnected movement components, wherein the movement components are designed as linear actuators with substantially coaxial longitudinal axes or longitudinal axes that are parallel to each other and that are interconnected in longitudinal direction such that their linear movements are superimposed on one another, and such that at least one of the linear actuators can be stopped at one or several predetermined positions.

7 Claims, 3 Drawing Sheets

DUAL LINEAR ACTUATOR

CROSS-REFERENCE TO RELATED APPLICATIONS

This application claims the benefit of the filing date of German Patent Application No 10 2007 027 698.4 filed 15 Jun. 2007, the disclosure of which application is hereby incorporated herein by reference.

FIELD OF THE INVENTION

The invention relates to an actuator comprising two or more interconnected movement components.

BACKGROUND OF THE INVENTION

Such actuators may, for example, be used as regulating drives for moving high-lift components of wings of modern commercial aircraft or transport aircraft. The term “movement component” also refers to a servomotor or actuator that forms a component of the actuator according to the invention and for this reason is referred to as a “movement component”. An actuator created from the combination of two or more movement components would combine the advantages inherent in the individual movement components and in this way would make it possible to provide an improved regulating drive. Advantages include, for example, the regulating speed, regulating precision, size of the regulating distance, extent of regulating torque and the like.

Such actuators, which have been formed by a combination of two movement components, are for example known from GB 850 639. In said patent application a so-called “dual actuator” is disclosed, which comprises a combination of a hydraulic actuator and a spindle drive. These two drive variants act kinematically parallel to each other so that when the spindle drive is actuated, a rotation of a drive-element and driven element on an axis of rotation is caused, while at the same time a linear movement of the piston-cylinder arrangement along its longitudinal axis takes place.

While this dual actuator combines two different movement components, they can however not be used for a common linear movement that would be helpful to the application, mentioned as an example, on high-lift components of an aircraft. Furthermore, the advantages provided by the various movement components cannot be used together, for example in order to render the longitudinal movement of the hydraulic actuator more precise. Therefore it would also not be possible to use the shown dual actuator for the movement, mentioned as an example, of high-lift components of an aircraft, in which movement the advantages of high regulating speed and high regulating accuracy are required, either together or separately, in a single movement direction.

SUMMARY OF THE INVENTION

According to an exemplary embodiment of the present invention an actuator is provided, comprising movement components that may be designed as linear actuators with essentially coaxial longitudinal axes or longitudinal axes that are parallel to each other and that are interconnected in longitudinal direction such that their linear movements are superimposed on one another, and such that at least one of the linear actuators can be stopped at one or several predetermined positions.

This may provide for an actuator which if required may provide high regulating speed and/or high regulating torque and/or greater regulating accuracy and/or a longer regulating distance than may be provided by conventional hydraulic actuators. By combining the movement components, which may be designed as linear actuators, with essentially coaxial or parallel longitudinal axes, a kinematic series connection of the movement components arises, as a result of which the linear movements of the given movement components may be superimposed on one another. By a corresponding selection of the movement components an actuator may be provided which at the same time comprises advantages that may be expedient for several applications. In order to provide fast actuating with a long regulating distance and with high regulating torque, for example a hydraulic linear actuator may be suitable. In contrast to this, if short precise deflections are required, a spindle drive is more likely to be used. Further types of actuators may provide further specific advantages and may be selected according to the desired application. To prevent the different characteristics of the movement components that may be used from being superimposed on one another in a disadvantageous manner it makes sense if at least one of the movement components may be stopped in one or several positions. For example, if an actuator according to the invention is designed at the same time for long regulating distances and high regulating torques as well as for short regulating distances and high precision, in order to provide the high regulating torques and long regulating distances, the more precise movement component may be stopped to protect it from unnecessary wear. Conversely, the more powerful movement component may be stopped at a position that has been very precisely predetermined so that it does not interfere with the more precise movement component. According to these advantages, the actuator may also be referred to as a “dual linear actuator”.

In an advantageous improvement of the invention, the first movement component may comprise a cylinder and a piston element; a second movement component may comprise a spindle arrangement that may be connected to a drive device, wherein the piston element is movably supported within the cylinder for being movable along the longitudinal axis of said cylinder; for moving the piston element on at least one surface of the piston element a pressurised fluid acts; the spindle arrangement may be connected to the cylinder or to the piston element; the direction of deflection of the spindle arrangement may be arranged parallel to the longitudinal axis of the cylinder; and deflection of the spindle arrangement may be kinematically superimposed on the movement of the piston element.

In this way a situation may be achieved in which a conventional hydraulic actuator with an axial regulating direction may be expanded by a spindle drive that may also act in axial direction. In this arrangement the spindle arrangement may be kinematically serially connected to the hydraulic drive. This means that an actuator with two connection points may be created whose distance from each other may be increased or reduced by actuating the hydraulic part of the actuator and of the spindle arrangement. The distance between the connection points of the actuator determines the position of the component to be moved. The precision of the position of the component to be moved by the actuator directly depends on the precision of the deflection of the actuator.

For example if a long regulating distance is to be covered at high speed, the hydraulic part of the actuator is made to make a deflection movement. In that a control valve is closed, the end position of the actuator is held. However, if a shorter regulating distance with high precision becomes necessary, after prior locking of the piston in a precisely determinable position, e.g. by moving against a mechanical end stop or by means of a precise locking device, the spindle arrangement can be used. In this way the advantages of both drive types are combined for a shared direction of deflection.

Additional advantageous improvements of the invention are also provided.

Below, the invention is explained in more detail with reference to the figures. In the figures the same objects have the same reference characters.

DETAILED DESCRIPTION

Figure 1:
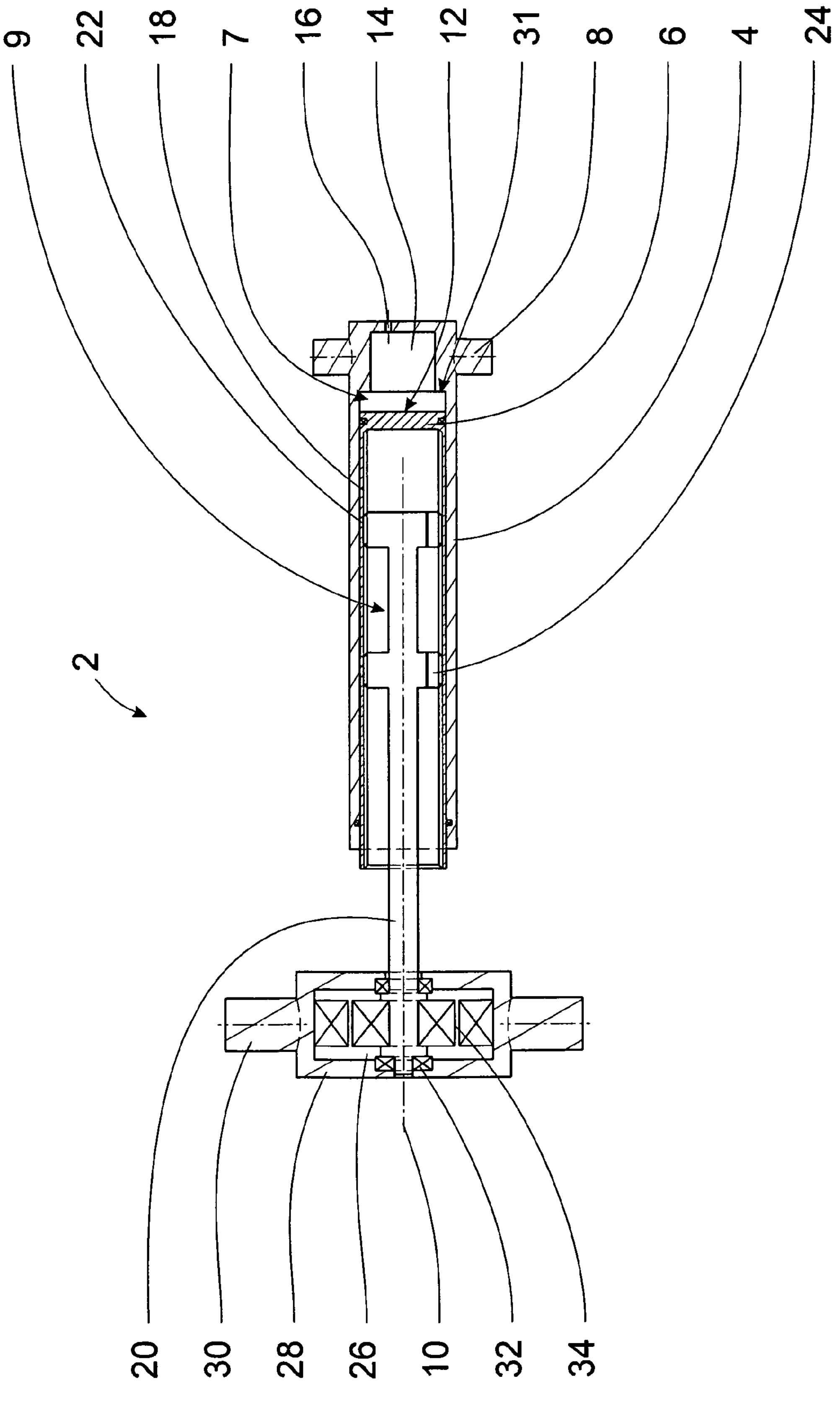
FIG. 1: a section view of a first exemplary embodiment of the actuator according to the invention.

The dual linear actuator 2 according to the invention, which actuator 2 is shown in FIG. 1, as an example comprises a cylinder 4 and a tubular piston element 6 which form the first movement component 7. On the side which is the right-hand side shown in FIG. 1 the cylinder 4 comprises fastening elements 8, which are, for example, designed as cylindrical trunnions that face each other.

On the side facing the fastening elements 8 the piston element 6 comprises a closed piston face 12 that points towards a hollow space 14 in the cylinder 4. By means of a control valve (not shown), a pressurised fluid can be fed into this hollow space 14 by way of an opening 16 in the cylinder, in which hollow space 14 said fluid exerts a force onto the piston face 12 in order to move the piston element.

On the inside of the piston element 6 there is a spindle thread 18 which is engaged by an elongated spindle element 20 with shoulders 24 that comprise a corresponding thread 22. The spindle element 20 is coaxially arranged within the piston element 6 and is rotatably held to a drive device 26. When the spindle element 20 is rotated, as a result of the design of the pair comprising the threads 18 and 22, a translatory movement of the spindle element 20 within the piston element 6 occurs. The spindle drive arrangement (hereinafter also referred to as the "spindle arrangement") forms the second movement component 9.

The drive device 26 comprises a housing 28 with fastening elements 30, which, for example, are designed as trunnions, as is the case in cylinder 4. The housing 28 comprises suitable bearings 32 and an electric motor 34 for driving the spindle element 20 relative to the housing. Optionally, motors providing other modes of operation may be possible, for example hydraulic motors.

To prevent rotation of the piston element 6 during rotation of the spindle element 20 within the cylinder 4, said piston element 6 is guided in a non-rotational manner within the cylinder 4. This can take place by means of various measures. For example, the diameters of the piston element 6 and of the interior space of the cylinder 4 are other than circular. Tongue and feather-key connections or the like may provide a further option of a non-rotation device.

The actuator 2 is preferably held, by means of the fastening elements 8 and 30, such that one side of the actuator 2 is located at a fixed point of a system or a device, while the other side of the actuator 2 is arranged at a movable component. The movable component may, for example, be a high-lift component of an aircraft, while the fixed point may be arranged at a brace within an aircraft wing. By means of the fastening elements 8 and 30 the actuator 2 is not only held so as to transfer a compressive force, but also so as to fully take up the torque transmitted by the drive device 26, so that the actuator 2 does not rotate on its longitudinal axis.

If in the actuator 2 shown a pressurised fluid is fed into the hollow space 14 through the opening 16, a compressive force acts on the piston surface 12. If this force exceeds the counterforce acting on the actuator 2 and exceeds the static friction between the piston element 6 and the cylinder 4, the piston element 6 moves away from the opening 16, wherein the end of the piston element 6, which end faces away from the opening 16, comes out of the cylinder 4. This movement of the piston element 6 may take place at high speed, which speed depends on the size of the opening 16, on the pressure exerted on the fluid, on the position of a control valve (not shown) for controlling the fluid flow through the opening 16, and on the counterforce acting on the actuator 2. In this arrangement, the maximum deflection of the actuator 2 is delimited by the length of the piston element 6.

As a result of the deflection the space between the fastening elements 8 and 30 arranged on opposite ends of the actuator 2 increases. Following the previous example, this space may determine the position or the movement of a high-lift component.

Due to the design of the cylinder 4, wherein one side is open, it is not possible to move the piston element 6 back into the cylinder 4 in the same manner by means of applying pressure. In the actuator 2 shown, this is possible only by means of an (external) counterforce acting on the actuator 2, provided the opening 16 is open, by means of a control valve, until the desired position of the piston element 6 has been reached and in this manner the fluid located in the hollow space 14 can leave the hollow space 14. The counterforce may, for example, be present in the form of a force of air acting on the moved high-lift component. As an alternative, a return force may be generated by additional construction elements, for example a spring.

If there is a requirement for precise deflection with the use of the spindle arrangement, the deflection speed and the direction of movement depend on the lead of the pair of threads 18 and 22 as well as on the rotational speed and the direction of rotation of the drive device 26. Preferably, in the design of the spindle arrangement the lead of the pair of threads is designed such that self-locking occurs, so that after a determined rotational movement of the spindle element 20 the position achieved in this way is held. Should this not be possible or practicable, holding the position may, for example, be implemented by means of an additional brake device on the spindle element 20. Thus, for example in the case of commonly used low-friction recirculating ball screws no self-locking occurs, and consequently no continuous compensation of a restoring torque is necessary in order to maintain a set deflection.

By means of rotation using the drive device 26 the spindle element is moved into the piston element 6 or out of the piston element 6. Precise deflection of the actuator 2 by means of the spindle arrangement not only necessitates precise movement of the spindle arrangement but also a precisely determinable position of the piston element, on which position the resulting superimposition of the spindle movement depends. Since the measuring accuracy of electronic sensors may be influenced by aging, temperature and other environmental conditions it makes sense if the piston element 6 is stopped at a mechanically predetermined position, for example at a mechanical end stop 31, in order to be able to meet the stringent requirements. As an alternative, other means for mechanically stopping the piston element 6 to ensure the regulating precision of the spindle arrangement are imaginable.

Figure 2:
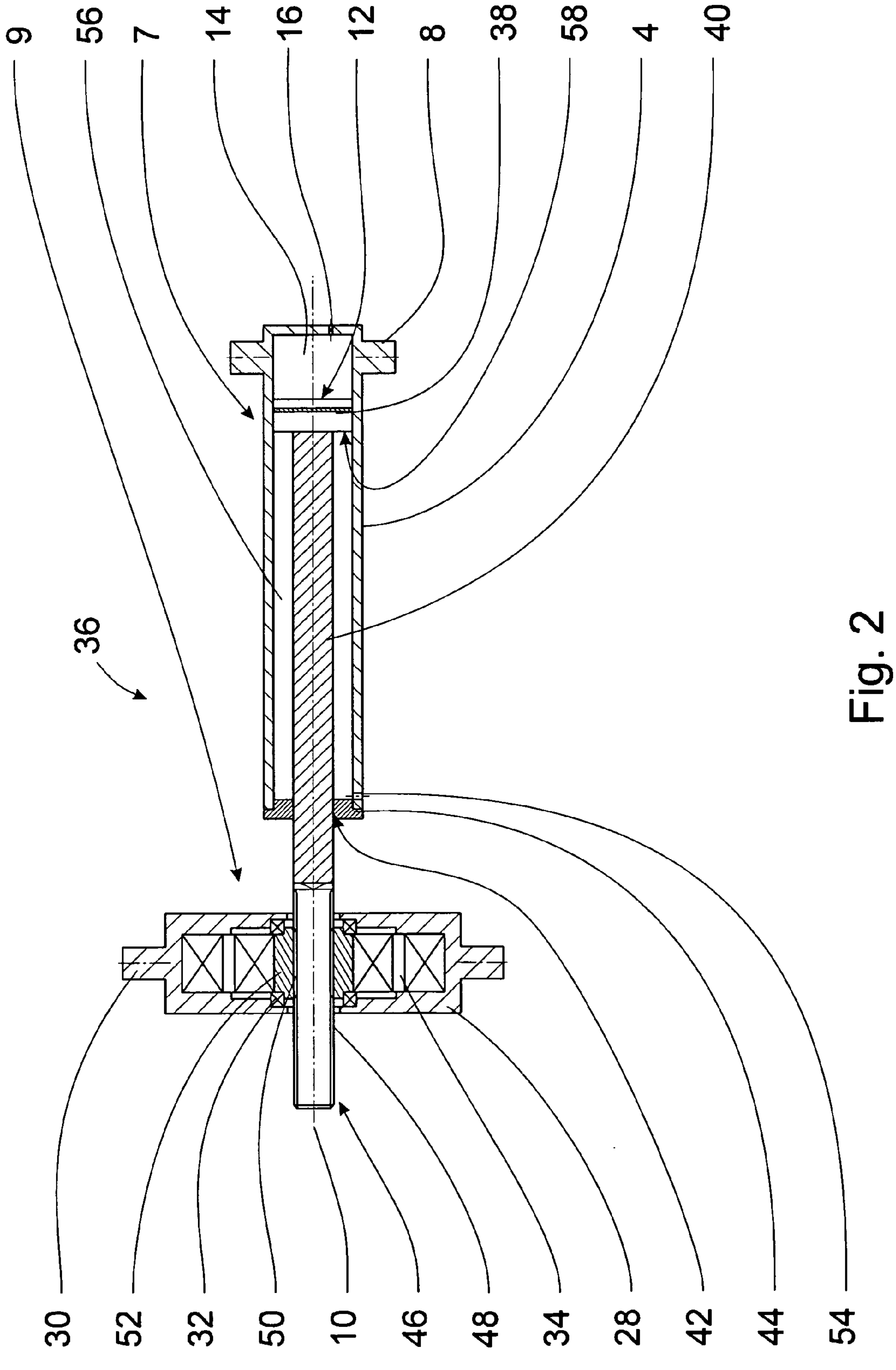
FIG. 2: a section view of a second exemplary embodiment of the actuator according to the invention.

FIG. 2 shows a modification of the actuator 2 shown in FIG. 1 in the form of an actuator 36. The actuator 36 comprises a cylinder 4 in which a piston 38 is held so as to be axially movable. On the piston 38 a piston rod 40 is arranged, which is aligned coaxially to the longitudinal axis 10 of the cylinder 4 and protrudes from a cutout 42 in a cylinder cover plate 44 of the cylinder 4, which cylinder cover plate 44 faces away from the opening 16. The end 46 of the piston rod 40, which end 46 projects from the cylinder 4, further comprises a thread 48 that corresponds to a spindle thread 50 of a threaded spindle sleeve 52 that can be driven by the motor 34 and that is held in the housing 28.

By rotating the threaded spindle sleeve 52 in the housing 28, depending on the lead of the pair of threads 48 and 50 and on the rotary speed of the motor 34, the piston rod 40 is axially moved relative to the threaded spindle sleeve 50. The torque produced by the motor 34 is taken up on the one hand by the fastening elements 8 and 30 so that the actuator 36 does not rotate on its own axis. On the other hand it is necessary for the torque acting on the piston rod 40 to effectively be taken up at the cylinder 4. To this effect, the cross section of a region of the piston rod 40, which region is situated between the piston 38 and a region of the piston rod 40 that in the screwed-in state is situated near the threaded spindle sleeve 50, is designed so as not to be circular so that rotation of the piston rod 40 relative to the section 42 of the cylinder cover plate 44 of the cylinder 4 is prevented. This cross section may, for example, comprise an elliptic or square form.

Analogous to the embodiment described in FIG. 1, by means of introducing a pressurised fluid through the opening 16 into the hollow space 14, by the action of a compressive force onto the piston face 12, the piston 38 can be moved away from the opening 16. In this exemplary embodiment the cylinder 4 is, however, closed on both sides and at its end facing the area 44 comprises a further opening 54, which is also used for the placement or removal of fluid that is located in a further hollow space 56, which hollow space 56 is separated by the piston 38 from the hollow space 14 situated at the opening 16. In order to move the piston 38 in the direction of the opening 16, at its side facing the hollow space 56 and the piston rod 40 the piston comprises a surface 58 on which a force can act by way of a pressurised fluid. Accordingly it may be possible, when placing pressurised fluid into one of the two openings 16 or 54 while at the same time opening the respective other opening 54 or 16, to move the piston to the left-hand side or to the right-hand side in the drawing plane.

The method according to the invention for the deflection of a dual linear actuator is explained with reference to the various possible operational modes that are diagrammatically shown in FIG. 3. The reference characters shown in parentheses correspond to the method-related steps carried out and shown in the figures.

Figure 3:
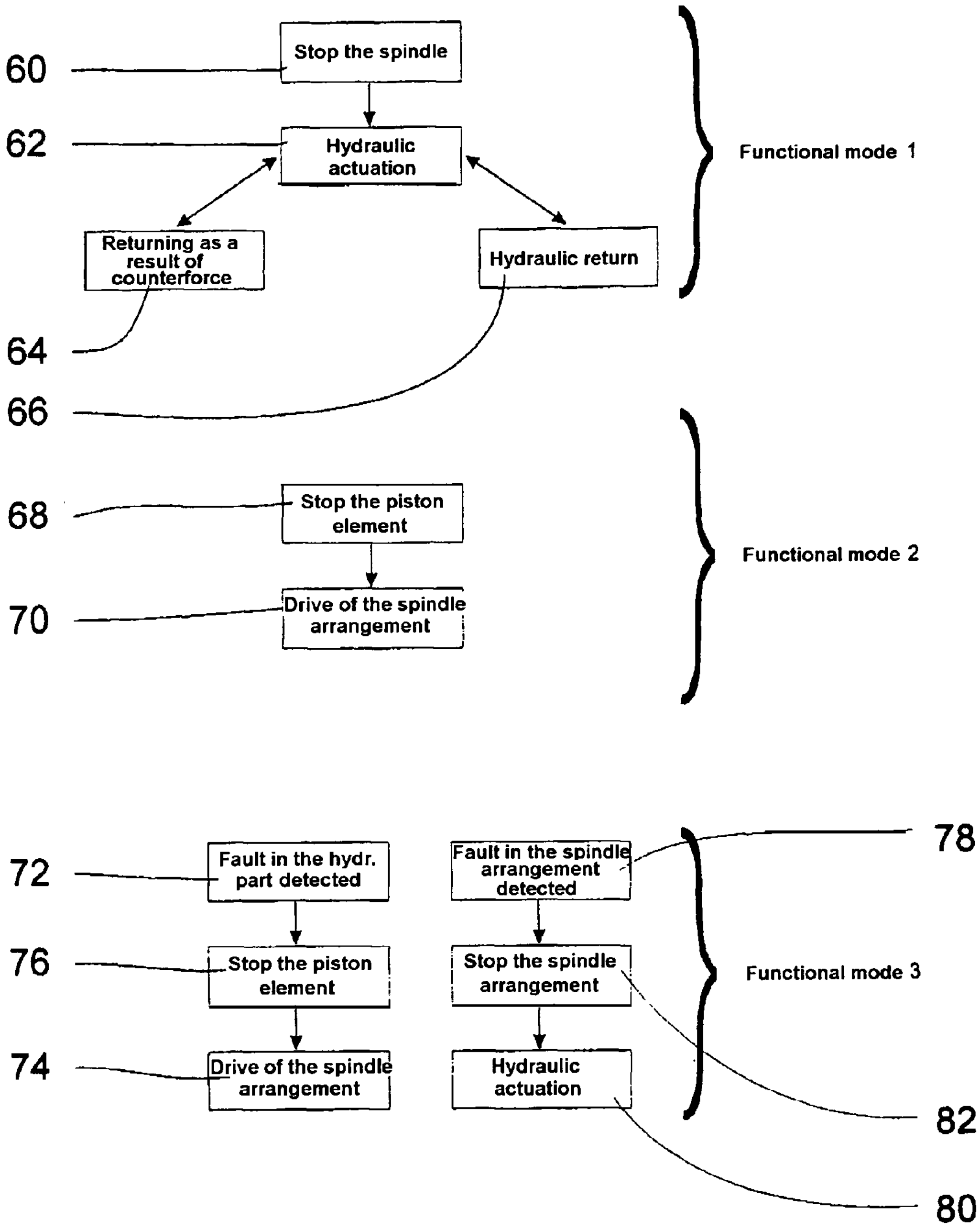
FIG. 3: a diagrammatic view of a method according to the invention (functional modes 1-3).

The first functional mode shown in FIG. 3 (functional mode 1) is used for fast actuating with a long stroke. In this arrangement the motor 34 of the drive device 26 remains switched off, and the spindle arrangement is locked (step 60). If no self-locking spindle threads are used, as an alternative to self-locking with the motor switched off the spindle element 20 or the threaded sleeve 52 may be secured against rotation by means of a brake.

The piston element 6 or the piston 38 is moved away from the opening 16 in the cylinder 14 by means of a pressurised fluid (step 62). The function is identical to that of a conventional hydraulic actuator. In the first exemplary embodiment shown in FIG. 1 actuating would be possible only in this direction; returning requires an (exterior) counterforce or some other construction element for restoring the piston element 6 (step 64). The other exemplary embodiment from FIG. 2 makes returning possible by means of a pressurised fluid, which while the opening 16 is open at the same time enters the cylinder 4 by way of the opening 54 (step 66).

The second functional mode (functional mode 2) is provided for more precise actuation with a short stroke. Rotation of the spindle element 20 or of the threaded sleeve 52 is converted to a linear movement of the piston element 6 or of the piston rod 40, which may be controlled significantly more precisely than is the case with the hydraulic part of the actuator 2 or 36. In order to provide the best possible accuracy in this functional mode it is necessary for the piston element 6 or for the piston 38 for decoupling the hydraulic part to be locked (step 68) in that it approaches, for example, a mechanical end stop and rests against said mechanical end stop. Subsequently the spindle arrangement is driven (step 70) to bring about the deflection of the actuator 2, 36.

Finally, the third functional mode (functional mode 3) is used to operate the actuator 2 or 36 with a corresponding design as a so-called active/standby actuator. If the hydraulic part of the dual linear actuator fails, in this way the spindle drive may serve as a replacement. In this case it is advantageous if the maximum deflection of the spindle drive corresponds to that of the hydraulic part. On the other hand the hydraulic part can also assume the function of the spindle drive should this spindle drive fail.

If an error in the hydraulic part is detected by a corresponding monitoring device (not shown in detail) (step 72), to provide deflection of the actuator 2 or 36 the spindle arrangement could be driven (step 74). It is advantageous to first lock the hydraulic part of the actuator 2 or 36 (step 76) such that it may be mechanically decoupled. If on the other hand a failure of the spindle drive is detected (step 78), the hydraulic part can assume its function (step 80). Analogous to the case of a fault in the hydraulic part it is again necessary for the spindle drive to be mechanically decoupled or stopped (step 82). This takes place by self-locking the pair of spindle threads 18, 22 or 48, 50, or by activating a corresponding brake located near the motor 34.

When changing between functional modes, it is understood that any respective locking of the hydraulic part or of the spindle arrangement is undone if required. The exemplary embodiment of an actuator according to the invention in the form of the dual linear actuator 2 or 36 thus represents an actuator which may achieve both long regulating distances at high regulating speeds and short regulating distances at very high precision.

While the exemplary embodiments refer to a combination of spindle arrangement and hydraulic actuator, any other combinations of any imaginable types of actuators or servomotors are imaginable, depending on the application and the associated requirements. Furthermore, the invention is not limited to a combination of two linear actuators, because in particular applications it may well be advantageous if more than two linear actuators are connected in series, and if at least one of these actuators may be stopped at predefined positions. The exemplary embodiments partly refer to the movement of high-lift components of a commercial aircraft or a transport aircraft; however, the use of an actuator according to the invention is in no way limited to this field. Instead, the actuator according to the invention may be used in all the technical fields in which linear deflection is required, whose requirements concerning the regulating torque, regulating speed, precision, regulating distance and the like vary in various application cases.

The invention claimed is:

1. A method for deflecting an actuator comprising at least first and second interconnected movement components, wherein the at least first and second movement components comprise, respectively, first and second linear actuators with substantially coaxial first and second longitudinal axes, respectively, or first and second longitudinal axes, respectively, that are parallel to each other, the first and second linear actuators being interconnected in a longitudinal direction such that the linear movements of the first and second linear actuators are superimposed on one another, and such that at least one of the first and second linear actuators is adapted for being stopped at one or more predetermined positions, wherein at least one of the at least first and second movement components comprises a hydraulic piston actuator including a tubular piston element having a closed piston face on one end and being movably positioned inside a cylinder having a hollow space therein, wherein at least another of the at least first and second movement components comprises a spindle arrangement connected to a drive device, the spindle arrangement including an elongated spindle element with a first spindle thread that corresponds to a second spindle thread that is arranged on an inside of the piston element, the method comprising:

stopping the first movement component at a predetermined position, causing the second movement component to make a deflection, and stopping the spindle arrangement if a failure of the spindle arrangement is detected and employing the hydraulic piston actuator for providing long and short regulating distances.

2. The method of claim 1, further comprising stopping the first movement component for the provision of long regulating distances and high regulating speed, and moving the piston element arranged in the second movement component along the longitudinal axis of the cylinder of the second movement component by a pressurised fluid placed through one or more openings, wherein the first movement component comprises the spindle arrangement, and wherein the second movement component comprises the hydraulic actuator.

3. The method of claim 1, further comprising stopping the piston element for providing short regulating distances and high regulating precision, and driving the spindle arrangement by the drive device.

4. The method of claim 1, further comprising stopping the piston element if a failure of the hydraulic drive of the piston element and of the cylinder is detected, and employing the spindle arrangement for providing long and short regulating distances.

5. An actuator, comprising:

at least first and second interconnected movement components, wherein the at least first and second movement components comprise, respectively, first and second linear actuators with substantially coaxial first and second longitudinal axes, respectively, or first and second longitudinal axes, respectively, that are parallel to each other, the first and second linear actuators being interconnected in a longitudinal direction such that the linear movements of the first and second linear actuators are superimposed on one another, and such that at least one of the first and second linear actuators is adapted for being stopped at one or more predetermined positions;

wherein at least one of the at least first and second movement components comprises a hydraulic piston actuator including a tubular piston element having a closed piston face on one end and being movably positioned inside a cylinder having a hollow space therein;

wherein at least another of the at least first and second movement components comprises a spindle arrangement connected to a drive device, the spindle arrangement including an elongated spindle element with a first spindle thread on an outside surface thereof that corresponds to a second spindle thread that is arranged on an inside surface of the piston element;

wherein the second spindle thread substantially extends longitudinally on the inner surface of the piston element, wherein the hollow space of the cylinder is substantially of a cylindrical shape, wherein the piston element is of a cylindrical shape substantially corresponding with the inner diameter of the hollow space of the cylinder, and wherein the spindle element is configured for transferring torque to the piston element.

6. The actuator according to claim 5, wherein the piston element is of a cylindrical shape substantially corresponding with the inner diameter of the hollow space of the cylinder wherein the spindle element comprises at least two shoulders radially extending from the spindle element to the second spindle thread of the piston element for transferring torque to the piston element.

7. An actuator, comprising:

at least first and second interconnected movement components, wherein the at least first and second movement components comprise, respectively, first and second linear actuators with substantially coaxial first and second longitudinal axes, respectively, or first and second longitudinal axes, respectively, that are parallel to each other, the first and second linear actuators being interconnected in a longitudinal direction such that the linear movements of the first and second linear actuators are superimposed on one another, and such that at least one of the first and second linear actuators is adapted for being stopped at one or more predetermined positions;

wherein at least one of the at least first and second movement components comprises a hydraulic piston actuator including a tubular piston element having a closed piston face on one end and being movably positioned inside a cylinder having a hollow space therein;

wherein at least another of the at least first and second movement components comprises a spindle arrangement connected to a drive device, the spindle arrangement including an elongated spindle element with a first spindle thread on an outside surface thereof that corresponds to a second spindle thread that is arranged on the inside surface of the piston element;

wherein the actuator is configured for stopping the spindle arrangement if a failure of the spindle arrangement is detected, and wherein the actuator is further configured for employing the hydraulic piston actuator for providing long and short regulating distances, if a failure of the spindle arrangement is detected.

* * * * *